(12) United States Patent
Flores et al.

(10) Patent No.: US 10,797,958 B2
(45) Date of Patent: *Oct. 6, 2020

(54) ENABLING REAL-TIME OPERATIONAL ENVIRONMENT CONFORMITY WITHIN AN ENTERPRISE ARCHITECTURE MODEL DASHBOARD

(71) Applicant: International Business Machines Corporation, Armonk, NY (US)

(72) Inventors: Romelia H. Flores, Keller, TX (US); Leonard S. Hand, Red Creek, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 415 days.

This patent is subject to a terminal disclaimer.

(21) Appl. No.: 15/201,481

(22) Filed: Jul. 3, 2016

(65) Prior Publication Data

US 2016/0315823 A1    Oct. 27, 2016

Related U.S. Application Data

(63) Continuation of application No. 13/611,005, filed on Sep. 12, 2012, now Pat. No. 9,383,900.

(51) Int. Cl.
*G06Q 10/00* (2012.01)
*G06F 3/048* (2013.01)
(Continued)

(52) U.S. Cl.
CPC ............ *H04L 41/14* (2013.01); *G06F 3/0484* (2013.01); *G06Q 10/0639* (2013.01);
(Continued)

(58) Field of Classification Search
CPC . G06F 3/00; G06F 3/048; G06F 11/00; G06F 11/30; G06F 8/00; G06Q 10/00; G06Q 30/00; G06Q 10/067
See application file for complete search history.

(56) References Cited

U.S. PATENT DOCUMENTS 5,560,012 A    9/1996   Ryu et al.
5,917,730 A    6/1999   Rittle et al.
(Continued)

OTHER PUBLICATIONS

"Object Management Group, Business Process Model and Notation (BPMN)", [online] Object Management Group, Jan. 2011, OMG Doc No. formal/Jan. 13, 2011, retrieved from the Internet: <file:///C:/Users/Alaine/Downloads/formal-11-01-03.pdf>, 538 pg.
(Continued)

*Primary Examiner* — Hugo Molina
(74) *Attorney, Agent, or Firm* — Cuenot, Forsythe & Kim, LLC (57) ABSTRACT

An enterprise model associated with an operational environment within an operational dashboard can be identified. The model can include an entity which can be an operational node, an architecture component node, a resource, a goal, or a constraint of an enterprise organization. The environment can include element which can be a computing resource and a computing resource state associated with the organization. An operational state change within the operational environment can be performed. A result of the change can be presented within an architectural view of the model within the dashboard. The result can include a context, a policy, a function, or a relationship affecting the model.

20 Claims, 5 Drawing Sheets

(51) Int. Cl.
*H04L 12/24* (2006.01)
*G06F 3/0484* (2013.01)
*G06Q 10/06* (2012.01)
*G06Q 10/10* (2012.01)

(52) U.S. Cl.
CPC ........... *G06Q 10/10* (2013.01); *H04L 41/142* (2013.01); *H04L 41/22* (2013.01)

(56) References Cited

U.S. PATENT DOCUMENTS

| | | | |
|---|---|---|---|
| 7,003,560 | B1 | 2/2006 | Mullen et al. |
| 7,822,594 | B2 | 10/2010 | Haviv et al. |
| 8,234,223 | B1* | 7/2012 | Maginniss ......... G06Q 30/0283 |
| | | | 705/400 |
| 8,253,753 | B1* | 8/2012 | Baraff ..................... G06T 19/00 |
| | | | 345/418 |
| 9,383,900 | B2 | 7/2016 | Flores et al. |
| 2002/0133809 | A1 | 9/2002 | Hills |
| 2005/0091093 | A1 | 4/2005 | Bhaskaran et al. |
| 2006/0069717 | A1 | 3/2006 | Mamou et al. |
| 2006/0080289 | A1 | 4/2006 | Brunswig et al. |
| 2006/0242103 | A1* | 10/2006 | Chavda ............... G06F 11/3419 |
| 2007/0006177 | A1 | 1/2007 | Aiber et al. |
| 2008/0270077 | A1* | 10/2008 | Ozonat ............... G06F 11/3409 |
| | | | 702/186 |
| 2009/0192867 | A1 | 7/2009 | Farooq et al. |
| 2010/0057766 | A1 | 3/2010 | Hartley et al. |
| 2010/0110933 | A1 | 5/2010 | Wilcock et al. |
| 2010/0281455 | A1 | 11/2010 | Anand et al. |
| 2010/0318836 | A1* | 12/2010 | Ness ................... G06F 11/0709 |
| | | | 714/4.1 |
| 2011/0061013 | A1* | 3/2011 | Bilicki ................. G06Q 10/06 |
| | | | 715/771 |
| 2011/0066565 | A1 | 3/2011 | Day |
| 2011/0087614 | A1* | 4/2011 | Whittington ........... G06Q 10/06 |
| | | | 705/348 |
| 2011/0153636 | A1 | 6/2011 | Coldicott et al. |
| 2011/0196719 | A1 | 6/2011 | Bhandari et al. |
| 2011/0231817 | A1 | 9/2011 | Hadar et al. |
| 2012/0072884 | A1 | 3/2012 | Balko et al. |
| 2012/0102032 | A1* | 4/2012 | Byrne ............... G06F 17/30294 |
| | | | 707/737 |
| 2012/0137165 | A1* | 5/2012 | Wu ..................... G06F 11/2025 |
| | | | 714/4.11 |
| 2012/0159426 | A1* | 6/2012 | Seel ......................... G06F 8/10 |
| | | | 717/104 |
| 2012/0185232 | A1* | 7/2012 | Sankar ................ G06F 11/3604 |
| | | | 703/22 |
| 2012/0296624 | A1* | 11/2012 | Jeng ................... G06Q 10/0639 |
| | | | 703/22 |
| 2012/0303396 | A1* | 11/2012 | Winkler ................. G06Q 10/00 |
| | | | 705/7.11 |
| 2013/0138575 | A1* | 5/2013 | Zabrovarnyy ........... G06F 8/10 |
| | | | 705/348 |
| 2013/0159062 | A1* | 6/2013 | Stiehl ..................... G06Q 10/06 |
| | | | 705/7.36 |
| 2013/0232464 | A1 | 9/2013 | Jacquin et al. |
| 2013/0246858 | A1* | 9/2013 | Ceglia ................ G05B 23/0272 |
| | | | 714/47.1 |
| 2013/0282746 | A1 | 10/2013 | Balko et al. |
| 2014/0074749 | A1 | 3/2014 | Flores et al. |
| 2014/0075357 | A1 | 3/2014 | Flores et al. |

OTHER PUBLICATIONS

U.S. Appl. No. 13/611,005, Non-Final Office Action dated Apr. 29, 2014, 21 pg.
U.S. Appl. No. 13/611,005, Final Office Action dated Jul. 15, 2014, 20 pg.
U.S. Appl. No. 13/611,005, Non-Final Office Action dated Nov. 21, 2014, 21 pg.
U.S. Appl. No. 13/611,005, Final Office Action dated Jun. 19, 2015, 28 pg.
U.S. Appl. No. 13/611,005, Notice of Allowance, dated Mar. 28, 2016, 5 pg.
U.S. Appl. No. 13/611,065, Non-Final Office Action dated Jan. 27, 2015, 21 pg.
U.S. Appl. No. 13/611,065, Final Office Action dated Jul. 24, 2015, 41 pg.
U.S. Appl. No. 13/611,065, Non-Final Office Action dated Mar. 16, 2016, 57 pg.

* cited by examiner

ENABLING REAL-TIME OPERATIONAL ENVIRONMENT CONFORMITY WITHIN AN ENTERPRISE ARCHITECTURE MODEL DASHBOARD

BACKGROUND

The present invention relates to the field of enterprise management and, more particularly, to enabling real-time operational environment conformity to an enterprise architecture model.

Traditionally, operation centers (OCs) run and manage an enterprise environment through a plethora of management tool dashboards. These dashboards are often built and updated via rules based discovery processes on the actual environment. Typically, the OC team can view the environment as a reflection of the "running" operational environment and the assets contained within the environment. The OC can group assets based on asset types, geography, lines of business, network connections, grid location, security zones, etc. Measurements (e.g., metrics) can be gathered on these assets and recorded for availability, capacity, and/or service level management. The OC can observe and manage (e.g., via one or more dashboards) the operational state of an environment based on operational measurements.

Currently, there is no mechanism to monitor an enterprise architecture model against real-time operations, therefore there is no way to monitor a target system's functional and non-functional requirements based on operational information. For example, when a target system's non-functional requirement (NFR) of the number of concurrent users is increased by an order of magnitude, there is no way to authoritatively identify the potential nodes/components which this NFR can impact. Additionally, OCs lack the ability to view the operational environment from an architecture design perspective. Furthermore, OC's lack the ability to reconcile design requirement changes and effect the operational environment. So the OC has no ability to synchronize Enterprise Architecture models with an operational environment and cannot react accordingly to poor system performance and/or adjust operational systems.

BRIEF SUMMARY

One aspect of the present invention can include a system, an apparatus, a computer program product and a method for enabling real-time operational environment conformity to an enterprise architecture model. An enterprise architecture model associated with an operational environment within an operational dashboard can be identified. The model can include an entity which can be an operational node, an architecture component node, a resource, a goal, or a constraint of an enterprise environment. The environment can include elements which can be a computing resource and a computing resource state associated with the environment. An operational state change within the operational environment can be performed. A result of the change can be presented within an architectural view of the model within the dashboard. The result can include a context, a policy, a function, or a relationship affecting the model.

Another aspect of the present invention can include an apparatus, a computer program product, a method and a system for enabling real-time operational environment conformity to an enterprise architecture model. An operations management engine can be configured to synchronize an enterprise architecture model associated with an operational environment. The enterprise architecture model can include an entity which can be an operational node, an architecture component node, a resource, a goal, and a constraint of an enterprise environment. The operational environment can include an element which can be a computing resource or a computing resource state associated with the enterprise organization. A data store can persist the enterprise architecture model or a dashboard configuration.

Yet another aspect of the present invention can include a user interactive interface able to present a difference between the functional requirement of an entity of an enterprise architecture model and the functioning of an element of an operational environment. The interface can be an operational dashboard. The enterprise architecture model can be associated with the operational environment. The enterprise architecture model can be an entity which can be an operational node, an architecture component node, a resource, a goal, or a constraint of an enterprise environment. The operational environment can include an element which can be a computing resource or a computing resource state associated with the enterprise environment.

DETAILED DESCRIPTION

The present disclosure is a solution for enabling real-time operational environment conformity to an enterprise architecture model. In the solution, an operational dashboard can include a logical view of an enterprise architecture model. In the dashboard, the view can present one or more differences between the entities within the model and the corresponding assets of the operational environment. In one instance, patterns can be developed within the view which can be utilized to verify operational functioning/performance and/or model constraints. It should be appreciated that the solution can permit the management of the operational environment based on system context.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
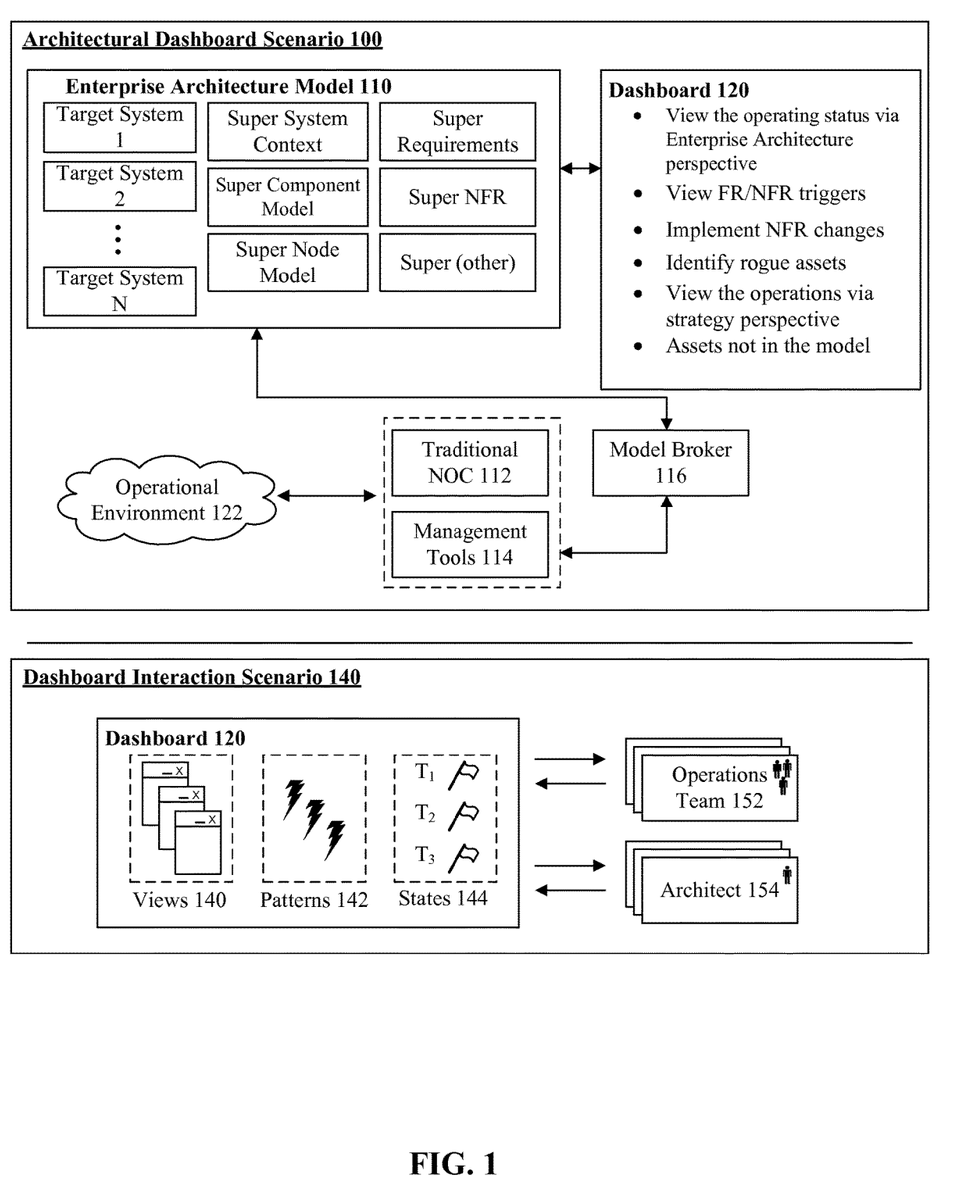
FIG. 1 is a schematic diagram illustrating a set of scenarios for enabling real-time operational environment conformity to an enterprise architecture model in accordance with an embodiment of the inventive arrangements disclosed herein.

FIG. 1 is a schematic diagram illustrating a set of scenarios 100, 140 for enabling real-time operational environment conformity to an enterprise architecture model in accordance with an embodiment of the inventive arrangements disclosed herein. Scenario 100, 140 can be present in the context of interface 210, methods 301, 302, 340, and/or system 400. In scenario 100, an enterprise dashboard 120 can be utilized to manage model 110 and operational environment 122. In scenario 140, an operations team 152 and/or an architect 154 can interact with dashboard 120 to manage views 140, patterns 142, and/or states 144 associated with operational environment 122. It should be appreciated that a strategic view can be a static data snapshot (e.g., enterprise architecture model 110) which can differ from a traditional operational view which can permit a dynamic (e.g., real-time) view of an operational environment (e.g., environment 122). That is, the disclosure can reconcile the static snapshot view with the dynamic view of the operational environment.

Dashboard 120 can be an interface for presenting one or more views 140 of an operational environment 122. Dashboard 120 can include, but is not limited to, key performance indicators (KPI), trends, comparisons, exceptions, historic data, and the like. Indicators can be associated with an operational node, an architecture component node, and the like. Indicators can include, but is not limited to, use case exceptions, standards violations, component model or note discrepancies, and the like. Dashboard 120 views 140 can include, but is not limited to, strategic, analytical, operational, informational, and any combination thereof.

As used herein, an enterprise architecture model 110 can be a collection of entities representing an enterprise organizational structure, an operational node, an architecture component node, a resource, a goal, a constraint and the like. The model 110 can include, but is not limited to, a target system, a context, a model component, a model node, a functional requirement, a non-functional requirement, and the like. The operational environment 122 can be a collection of elements including, but not limited to, a computing resource and/or a computing resource state associated with the enterprise organization. Elements can include, but is not limited to, a computing device, a computing environment, a distributed computing environment, a virtual computing environment, and the like. It should be appreciated that environment 122 can include one or more computing systems, computing devices, and the like. For example, environment can be an electronic mail server system.

In scenario 100, an operations dashboard 120 can be communicatively linked to an operational environment 122 via a traditional network operations center 112, management tools 114, and/or broker 116. In one instance, dashboard 120 can be associated with management tools 114. For example, dashboard 120 can be a screen of management tools 114. Dashboard 120 can present environment 122 metrics, structures, processes, flows, availability, traffic, and the like based on the enterprise architecture model elements. For example, dashboard 120 can reflect network traffic information contained in operations environment 122 and it's impact on specific component model elements 110. It should be appreciated that dashboard 120 can be a screen associated with an enterprise management application. For example, dashboard 120 can be associated with an IBM TIVOLI MONITORING software. Dashboard 120 can provide operating status through the lens of an enterprise architecture. In one instance, the operating status can be determined in real-time. Dashboard 120 can permit the presentation of functional requirements and/or non-functional requirements of the model 110 to be presented in the context of operational environment 122. For example, dashboard 120 can permit a comparison view which can indicate differences between operational environment 122 and enterprise architecture model 110.

In one embodiment, dashboard 120 can enable the implementation of non-functional requirement of model 110 within environment 122. In another embodiment, dashboard 120 can permit the identification of rogue assets within environment 122 not associated with enterprise architecture model 110 elements. In yet another embodiment, the dashboard 120 can permit a strategic view of operational environment 122 using model 110. For example, dashboard 120 can permit scenarios to be planned and/or run within the constraints of model 110 and/or operational environment 122 settings.

In one configuration of the scenario 100, broker 116 can be communicatively linked to operational environment via a traditional network operations center 112 and/or management tools 114. In the configuration, model broker 116 can permit the mapping of model 110 entities with operational environment 122 assets.

In dashboard interaction scenario 140, team 152 and/or architect 154 can collaborate to develop views 140 and/or patterns 142 which can be applied to environment 122 within the context of model 110. Dashboard 140 can be utilized to validate design patterns, pattern decisions, design requirements, and the like. For example, effects of operational changes which occur within environment 122 can be examined against the model 110 to determine the changes on architectural policy, function, and/or relationship. That is, the disclosure can formally bridge requirements, logical functional dimensions of a design with operational aspects while providing a continuous feedback loop. In one embodiment, the views 140 can be persisted based on team 152, architect 154 preferences, settings, and the like. In another embodiment, views 140 and/or patterns can be shared between team 152, architect 154, and the like enabling cooperative effort in managing environment 122 and/or model 110.

Drawings presented herein are for illustrative purposes and should not be construed to limit the invention in any regard. The dashboard 120 can include, but is not limited to, a Web based interface, a desktop interface, a mobile application interface, and the like.

Figure 2:
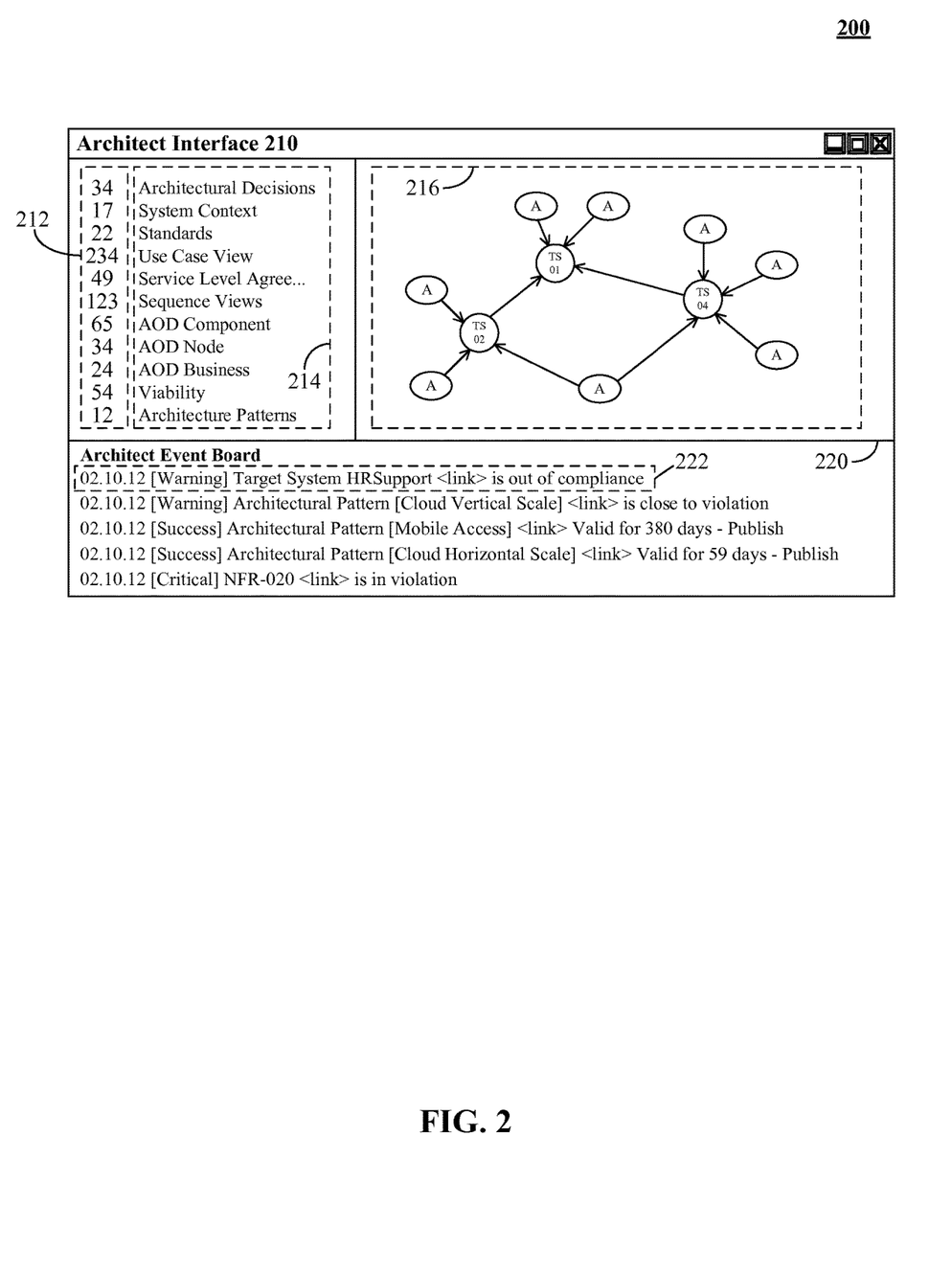
FIG. 2 is a schematic diagram illustrating an interface for enabling real-time operational environment conformity to an enterprise architecture model in accordance with an embodiment of the inventive arrangements disclosed herein.

FIG. 2 is a schematic diagram illustrating an interface 210 for enabling real-time operational environment conformity to an enterprise architecture model in accordance with an embodiment of the inventive arrangements disclosed herein. Interface 210 can be present in the context of the context of scenario 100, 140, method 301, 302, 340 and/or system 400. Architect interface 210 can be a screen of an enterprise modeling application, an operations management application, and the like. Interface 210 can include, but is not limited to, a selection pane 214, a graph 216, an event board 220, and the like.

In interface 210, selection pane 214 can present relevant views which can be selected by a user. Selection pane 214 can include view information 212, view description, and the like. Pane 214 can include, but is not limited to, an architectural perspective status, architectural element state (e.g., element numbers), and the like. For example, the number of architectural decisions (e.g., thirty four) associated with the model and/or environment can be presented within a pane 216 of interface 210.

In one instance, graph 216 can be a graphical representation of the enterprise architecture model and/or the operational environment. For example, graph 216 can permit nodes associated with events (e.g., notification 222) to be dynamically highlighted. In one instance, graph 216 can be utilized to indicate operational environment non-conformity with a model. In another instance, graph 216 can permit selection of critical nodes. In the instance, node selection can permit inspection of elements and/or relationships permitting granular assessment of the model and/or environment.

In one embodiment, interface 210 can present architectural event notifications 222 occurring within the operational environment. In the embodiment, notification 222 selection can permit links to be identified in graph 216. In one instance, event board 220 can be updated in real-time or near real-time. For example, as operational environment and/or model changes, event notifications can be generated and presented within board 220. Notifications 222 can include non-compliance notifications, error notifications, conflict notifications, and the like. Notifications 222 can be associated with a severity category, including, but not limited to, emergency, alert, critical, error, warning, success, notice, info, debug, and the like.

Drawings presented herein are for illustrative purposes only and should not be construed to limit the invention in any regard. Interface 210 can include one or more user interactive elements including, but not limited to, a pull down menu, a textbox, a text area, and like. Interface 210 can be accessible via a context menu, a pull down menu, and the like. In one embodiment, simultaneous notification of an event can occur within interface 210 and external to interface 210. For example, when a notification 222 is presented within board 220, the notification can be communicated as text message to an operations team member simultaneously.

Figure 3A:
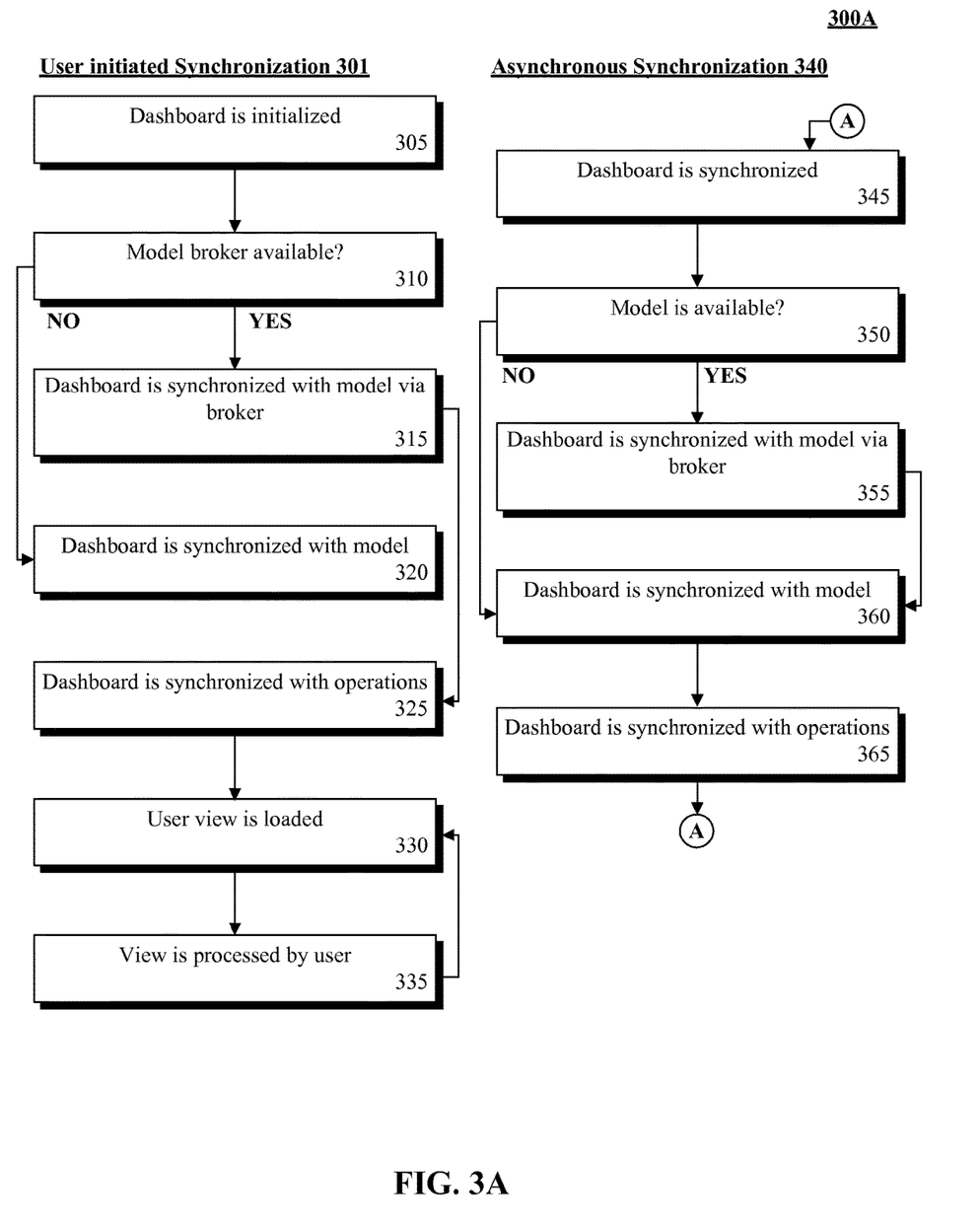
FIG. 3A is a schematic diagram illustrating a set of methods for enabling real-time operational environment conformity to an enterprise architecture model in accordance with an embodiment of the inventive arrangements disclosed herein.

FIG. 3A is a schematic diagram illustrating a set of methods for enabling real-time operational environment conformity to an enterprise architecture model in accordance with an embodiment of the inventive arrangements disclosed herein. Method 301, 302, 340 can be present in the context of scenario 100, 140 interface 210, and/or system 400. Method 301, 340 can represent the two flows which can be performed in serial or in parallel. The first flow can occur via user interaction (e.g., method 301) with an enterprise architecture modeling software (e.g., IBM RATIONAL SYSTEM ARCHITECT) interface and the other (e.g., method 340) can be performed asynchronously to keep the interface (e.g., dashboard) synchronized.

In step 305, an enterprise management application can be launched and an appropriate dashboard environment can be initialized. It should be appreciated that access control, preferences, and the like can be performed during the initialization. Further, it should be appreciated that there can be persistent storage for events, configuration, and cached operational data to ensure optimal synchronization. In step 310 if there is a model broker available, the method can continue to step 315, else proceed to step 320. In step 315, the dashboard can be synchronized with a model via the model broker. When a model broker is available, the broker can gather information from a model and associate model elements to operational assets within the operational environment. As such, the model broker can facilitate a mapping between which model aspects relate to operational assets. In one embodiment, the dashboard can permit local operational data to be synchronized with the model via the broker instead of directly with the model. In step 320, the dashboard can be synchronized with the model. In one embodiment, dashboard can be synchronized with the model via batched exports, direct connections to the model, and the like. It should be appreciated that synchronization can be contingent on the capabilities of the modeling tool.

In step 325, the dashboard can be synchronized with operations. The synchronization can validate the model data, determine non-model elements, and the like. That is, the dashboard can leverage system management components in the operations center to perform synchronization. In step 330, a user view can be loaded within the interface (e.g., dashboard) and presented to a user. In one embodiment, the dashboard can present data based on the role of the user and/or user preferences. In step 335, the view can be processed by the user. In the view, the user can determine the elemental views of the model. The dashboard can utilize on the local data, the model broker, the model, or the operational management systems to provide the user with the data associated with the processing. Steps 330, 335 can be performed continuously during the application session to enable real-time user management of an enterprise architecture model and an operational environment.

In step 345, the dashboard can be synchronized. In one embodiment, step 345 can be performed on a timed/interrupt basis via daemon processes in the dashboard. In the embodiment, the synchronization can be performed as a daemon process within the dashboard and can be run at a configured time period or through end user interruption. It should be appreciated that the daemon can leverage the application environment created in method 301. That is, it is implied that access control, preferences, and the like are handled in step 305 during initialization. It should be appreciated that a persistent storage for events, configuration and cached operational data within the application environment to ensure optimal synchronization can be present. In step 350, if there is a model available, the method can continue to step 355, else proceed to step 360. In one instance, when the model lacks operational data (e.g., no model available), the data can be collected from the operational environment and can be synchronized with the dashboard.

In step 355, the dashboard can be synchronized with the model via a model broker. In one instance, the dashboard can synchronize local data with the model via the broker instead of directly with the model. In step 360, the dashboard can be synchronized with the model. When no broker is available, the dashboard can be synchronized via batched exports, direct connections to the model, and the like. It should be appreciated that this functionality is contingent on the capabilities of the model. In step 365, the dashboard can be synchronized with operations of the operational model. In one instance, the dashboard can validate the model data, determine non-model elements, and the like.

Drawings presented herein are for illustrative purposes only and should not be construed to limit the invention in any regard. Method 301, 340 can be performed within a Service Oriented Architecture (SOA). Method 301, 340 can be performed in real-time or near real-time. It should be appreciated that the method 301, 340 can be synchronized with an enterprise architecture model.

Figure 3B:
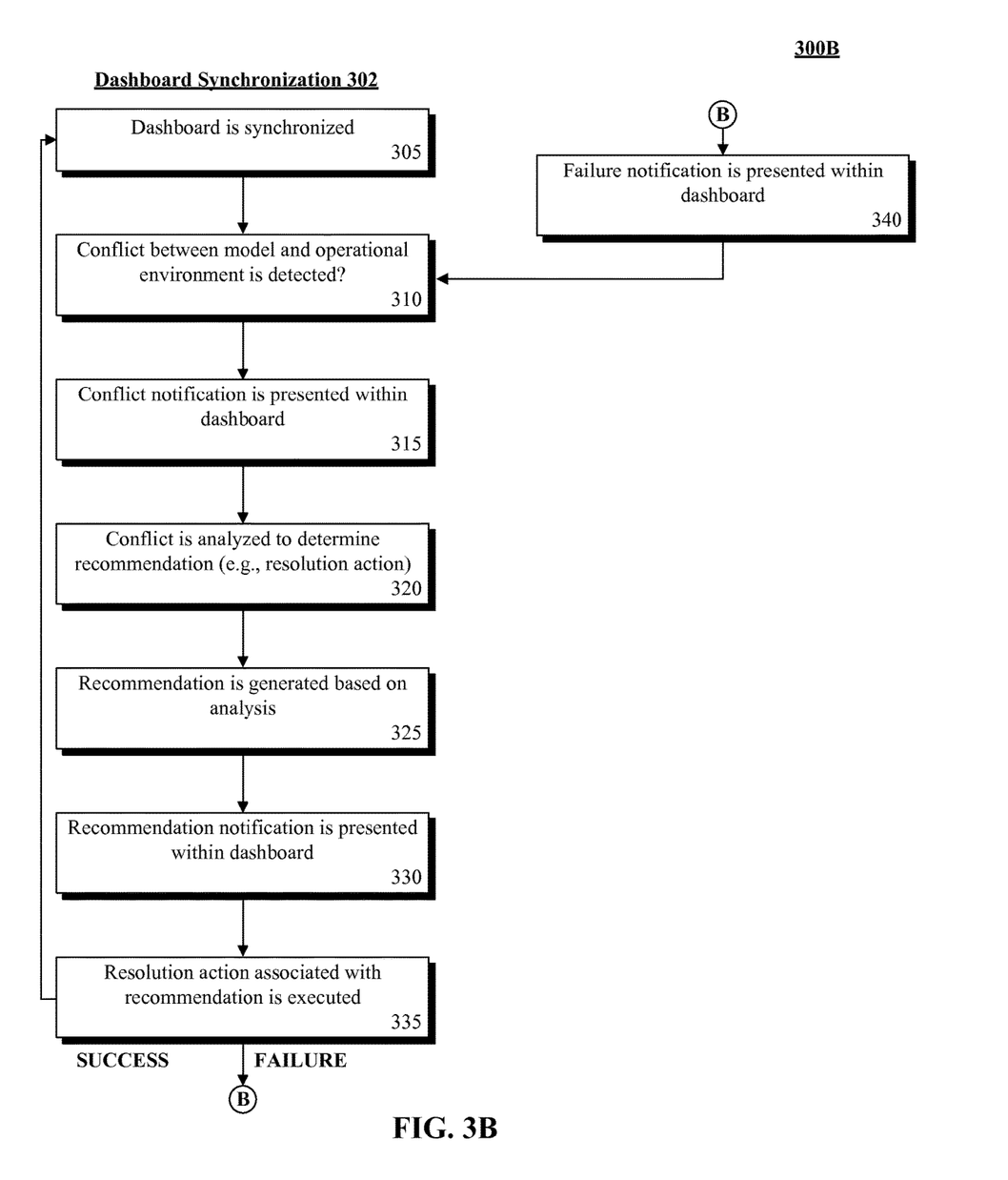
FIG. 3B is a schematic diagram illustrating a method for enabling real-time operational environment conformity to an enterprise architecture model in accordance with an embodiment of the inventive arrangements disclosed herein.

FIG. 3B is a schematic diagram illustrating a method 302 for enabling real-time operational environment conformity to an enterprise model in accordance with an embodiment of the inventive arrangements disclosed herein. Method 302 can be present in the context of scenario 100, 140 interface 210, method 301, 340, and/or system 400. In method 302, a dashboard of an enterprise architecture modeling application can permit dynamic conflict resolution between an enterprise architecture model and an operational environment.

In step 305, the dashboard can be synchronized. The synchronization can be performed in real-time or near real-time. In step 310, a conflict between the enterprise model and the operational environment can be detected. The conflict can include, but is not limited to, a functional requirement, a non-functional requirement, a constraint, a relationship, an input, an output, and the like. In step 315, a conflict notification can be presented within the dashboard. The notification can include, but is not limited to, a text exchange notification, a Short Message Service (SMS) message, a email notification, and the like. In one instance, the notification can be a pop-up notification within a rich internet application (MA) screen. In step 320, the conflict can be analyzed to determine a recommendation to resolve the conflict. In step 325, a recommendation can be generated based on the analysis. In one instance, the recommendation can include one or more resolution actions. In the instance, the resolution actions can be associated with a rating, preference, priority, and the like. That is, the resolution actions can be organized based on one or more criteria which can assist a user in resolution selection.

In step 330, a recommendation notification can be presented within the dashboard. The notification can be presented in real-time or near real-time. In one embodiment, the notification can permit the selection of a resolution action. In step 335, the resolution action associated within the recommendation can be run. If the resolution action is successful the method can return to step 305, else continue to step 340. In step 340, a failure notification can be presented within the dashboard. The method can proceed to step 310 and can continue for the duration of the application session.

Drawings presented herein are for illustrative purposes only and should not be construed to limit the invention in any regard. Method 302 can be performed within a Service Oriented Architecture (SOA). Method 302 can be performed in real-time or near real-time. It should be appreciated that the method 302 can be synchronized with an enterprise architecture model.

Figure 4:
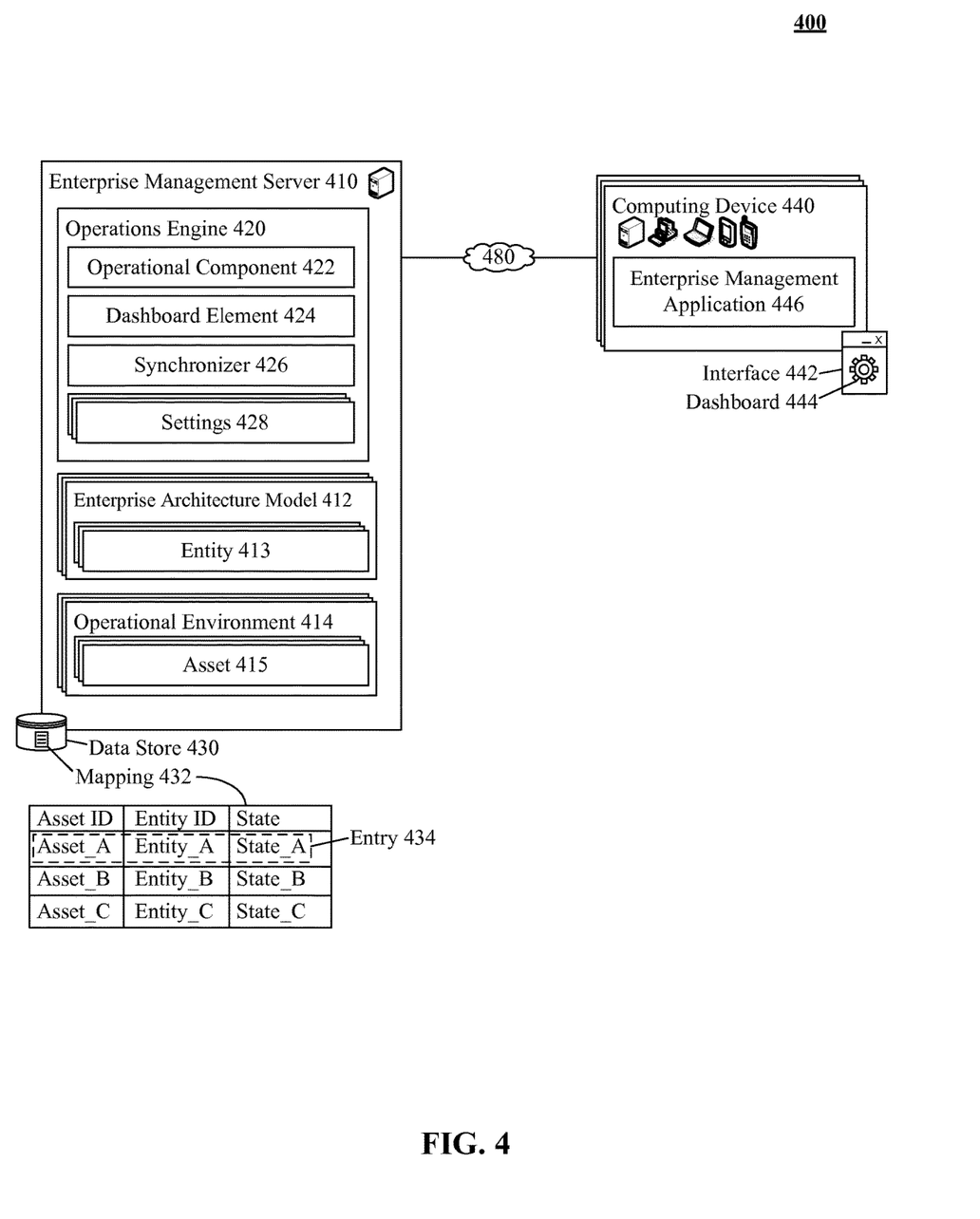
FIG. 4 is a schematic diagram illustrating a system for enabling real-time operational environment conformity to an enterprise architecture model in accordance with an embodiment of the inventive arrangements disclosed herein.

FIG. 4 is a schematic diagram illustrating a system 400 for enabling real-time operational environment conformity to an enterprise model in accordance with an embodiment of the inventive arrangements disclosed herein. System 400 can be performed in the context of scenario 100, 140, interface 210, and/or methods 301, 302, 340. In system 400, an operations engine 420 can permit a real-time dashboard 444 to manage the functional requirements, the non-functional requirements, the design principles, design decisions, element operational environment interrelationships, and the like of an operational environment 414. In the system, a mapping 432 can enable conformity between enterprise architecture model 412 and operational environment 414.

Enterprise management server 410 can be a hardware/software entity for executing an operations engine 420. Server 410 can include, but is not limited to, operations engine 420, enterprise architecture model 412, operational environment 414, data store 430, and the like. Server 410 functionality can include, but is not limited to, session management, authentication, encryption, and the like. Server 410 can include, but is not, limited to an, IBM SMART CLOUD MONITORING server, an IBM TIVOLI MONITORING server, and the like.

Operations engine 420 can be a hardware/software element for enabling an architectural view within an operations dashboard 444. Engine 420 can include, but is not limited to, operational component 422, dashboard element 424, synchronizer 426, settings 428, and the like. Engine 420 functionality can include, but is not limited to, notification functionality, receiving user input, data visualization, and the like. In one instance, engine 420 can be a portion of a dashboard software.

Operational component 422 can be a hardware/software entity for interacting with operational environment 414. Component 422 functionality can include, but is not limited to, metric collection, environment 414 selection, asset 415 detection, environment 414 analysis, and the like. In one instance, component 422 can be utilized to determine asset 415 state within the environment 414. In one embodiment, component 422 can be utilized to determine asset 415 relationships.

Dashboard element 424 can be a hardware/software element for generating dashboard 444 and/or dashboard 444 content. Element 424 functionality can include, but is not limited to, graphical rendering (e.g., graph), graphical element selection, and the like. In one instance, dashboard element 424 can generate traditional user role specific views with disclosure specific capabilities. For example, the dashboard element 424 can be utilized to present "drill down" operational view which can present non-functional requirements. In one embodiment, element 424 can present a conformance problem arising from a difference within environment 414 and model 412. In the embodiment, one or more recommendations for resolving the conformance problem can be presented within dashboard 444.

Synchronizer 426 can be a hardware/software entity for synchronizing model 412 with environment 414. Synchronizer 426 functionality can include, but is not limited to, model 412 analysis, model 412 synchronization, environment 414 synchronization, mapping 432 creation, mapping 432 maintenance, conformance detection, conflict resolution, recommendation generation, and the like. In one embodiment, synchronizer 426 can utilize mapping 432 to determine appropriate model 412 and asset 415 relationships. In one embodiment, synchronizer 426 can conform to a model broker.

Settings 428 can be one or more rules for establishing the behavior of system 400, server 410, and/or engine 420. Settings 428 can include, but is not limited to, operational component 422 settings, dashboard element 424 options, synchronizer 426 settings, dashboard 444 settings, and the like. Settings 428 can be manually and/or automatically established. In one instance, settings 428 can be heuristically determined. In one instance, settings 428 can be presented within interface 442 and/or dashboard 444.

Enterprise architecture model 412 can be a dataset utilized in representing an enterprise architecture information. For example model 412 can include a component interaction diagram. Model 412 can conform to a Unified Modeling Language (UML), Business Process Modeling Notation (BPMN), Extensible Markup Language (XML), and the like. It should be appreciated that the model 412 can include a structural view, a behavioral view, and the like.

Data store 430 can be a hardware/software component able to store dashboard 444 preferences, settings 428, mapping 432, and the like. Data store 430 can be a Storage Area Network (SAN), Network Attached Storage (NAS), and the like. Data store 430 can conform to a relational database management system (RDBMS), object oriented database management system (OODBMS), and the like. Data store 430 can be communicatively linked to server 410 in one or more traditional and/or proprietary mechanisms. In one instance, data store 430 can be a component of Structured Query Language (SQL) compliant database.

Mapping 432 can be a data set permitting the correlation of entity 413 to asset 415. Mapping 432 can be dynamically and/or statically generated from model 412 and/or environment 414. In one instance, mapping 432 can be heuristically generated based on historic models. Mapping 432 can include, but is not limited to, asset identifier, an entity identifier, a state information, and the like. For example, mapping 432 can include an entry 434 able to associated an Asset_A with an Entity_A and a State_A. State information can represent the status of the entity 413, asset 415, and the like. State information include, but is not limited to, conformity, non-conformity, and the like. In one embodiment, mapping 432 can conform to a database record, a file, and the like. For example, mapping 432 can conform to an XML file.

Computing device 440 can be a hardware/software permitting the processing and/or presentation of dashboard 444. Device 440 can include, but is not limited to, interface 442, enterprise management application 446, application 446 settings, and the like. Computing device 440 can include, but is not limited to, a desktop computer, a laptop computer, a tablet computing device, a PDA, a mobile phone, and the like. Computing device 440 can be communicatively linked with interface 442.

Interface 442 can be a user interactive component permitting presentation of dashboard 444. In one instance, interface 442 can be present in the context of an IBM RATIONAL SYSTEM ARCHITECT software. Interface 442 capabilities can include a graphical user interface (GUI), voice user interface (VUI), mixed-mode interface, and the like. In one instance, interface 442 can be communicatively linked to computing device.

Network 480 can be an electrical and/or computer network connecting one or more system 400 components. Network 480 can include, but is not limited to, twisted pair cabling, optical fiber, coaxial cable, and the like. Network 480 can include any combination of wired and/or wireless components. Network 480 topologies can include, but is not limited to, bus, star, mesh, and the like. Network 480 types can include, but is not limited to, Local Area Network (LAN), Wide Area Network (WAN), VPN and the like.

Drawings presented herein are for illustrative purposes only and should not be construed to limit the invention in any regard. One or more components of engine 420 can be present and/or optionally omitted permitting the functionality of the engine 420 is retained. It should be appreciated that one or more components of engine 420 can be combined and/or separated based on functionality, usage, and the like. In one instance, system 400 can conform to a Service Oriented Architecture (SOA).

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for managing an operational environment of entities that are computing assets, comprising:
   identifying, using an operational dashboard, an enterprise architecture model that is a static snapshot representing enterprise architecture information that does not include operational data from the operational environment;
   receiving real time metrics from the operational environment to establish a dynamic snapshot of operational data;
   generating a mapping that maps entities of the enterprise architecture model with elements in the dynamic snapshot of the operational environment;
   detecting, within the operational environment, an operational state change of one of the computing assets; and
   indicating, within the operational dashboard and using the mapping combined with the operational state change, an operating status of the operational environment.

2. The method of claim 1, further comprising:
   identifying a difference between a requirement of an entity within the operational environment and operational functioning of an element of the operational environment.

3. The method of claim 1, further comprising:
   identifying, as a rogue element, an element within the operational environment not mapped to the enterprise architecture.

4. The method of claim 1, further comprising:
   detecting, based upon the real-time metrics, a conflict between the enterprise architecture model and the operational environment.

5. The method of claim 4, further comprising:
   resolving the conflict by dynamically modifying the enterprise architecture model or the operational environment.

6. The method of claim 4, further comprising:
   generating a recommendation to resolve the conflict based upon an analysis of the conflict; and
   presenting, within the operational dashboard, the recommendation.

7. The method of claim 1, wherein
   the enterprise architecture model is a business processing model notation (BPMN) model construction in conformance with a BPMN language.

8. A computer hardware system configured to manage an operational environment of entities that are computing assets, comprising:
   a hardware processor configured to initiate the following computer-implemented operations:
      identifying, using an operational dashboard, an enterprise architecture model that is a static snapshot representing enterprise architecture information that does not include operational data from the operational environment;
      receiving real time metrics from the operational environment to establish a dynamic snapshot of operational data;
      generating a mapping that maps entities of the enterprise architecture model with elements in the dynamic snapshot of the operational environment;
      detecting, within the operational environment, an operational state change of one of the computing assets; and
      indicating, within the operational dashboard and using the mapping combined with the operational state change, an operating status of the operational environment.

9. The system of claim 8, wherein the hardware processor is further configured to initiate the following computer-implemented operation:
   identifying a difference between a requirement of an entity within the operational environment and operational functioning of an element of the operational environment.

10. The system of claim 8, wherein the hardware processor is further configured to initiate the following computer-implemented operation:
    identifying, as a rogue element, an element within the operational environment not mapped to the enterprise architecture.

11. The system of claim 8, wherein the hardware processor is further configured to initiate the following computer-implemented operation:
    detecting, based upon the real-time metrics, a conflict between the enterprise architecture model and the operational environment.

12. The system of claim 11, wherein the hardware processor is further configured to initiate the following computer-implemented operation:
    resolving the conflict by dynamically modifying the enterprise architecture model or the operational environment.

13. The system of claim 11, wherein the hardware processor is further configured to initiate the following computer-implemented operations:
    generating a recommendation to resolve the conflict based upon an analysis of the conflict; and
    presenting, within the operational dashboard, the recommendation.

14. The system of claim 8, wherein
    the enterprise architecture model is a business processing model notation (BPMN) model construction in conformance with a BPMN language.

15. A computer program product, comprising:
    a hardware storage device having stored therein computer readable program code for managing an operational environment of entities that are computing assets, the computer readable program code, which when executed by a computer hardware system, causes the computer hardware system to perform:

identifying, using an operational dashboard, an enterprise architecture model that is a static snapshot representing enterprise architecture information that does not include operational data from the operational environment;

receiving real time metrics from the operational environment to establish a dynamic snapshot of operational data;

generating a mapping that maps entities of the enterprise architecture model with elements in the dynamic snapshot of the operational environment;

detecting, within the operational environment, an operational state change of one of the computing assets; and     indicating, within the operational dashboard and using the mapping combined with the operational state change, an operating status of the operational environment.

16. The computer program product of claim 15, wherein the computer readable program code further causes the computer hardware system to perform:

identifying a difference between a requirement of an entity within the operational environment and operational functioning of an element of the operational environment.

17. The computer program product of claim 15, wherein the computer readable program code further causes the computer hardware system to perform:

identifying, as a rogue element, an element within the operational environment not mapped to the enterprise architecture.

18. The computer program product of claim 15, wherein the computer readable program code further causes the computer hardware system to perform:

detecting, based upon the real-time metrics, a conflict between the enterprise architecture model and the operational environment.

19. The computer program product of claim 18, wherein the computer readable program code further causes the computer hardware system to perform:

resolving the conflict by dynamically modifying the enterprise architecture model or the operational environment.

20. The computer program product of claim 15, wherein the enterprise architecture model is a business processing model notation (BPMN) model construction in conformance with a BPMN language.

\* \* \* \* \*